(12) United States Patent
Sase et al.

(10) Patent No.: US 7,714,913 B2
(45) Date of Patent: May 11, 2010

(54) OPTICAL BLACK LEVEL CONTROL CIRCUIT

(75) Inventors: Masatoshi Sase, Kanagawa (JP); Koichi Higashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1420 days.

(21) Appl. No.: 11/111,014

(22) Filed: Apr. 21, 2005

(65) Prior Publication Data

US 2005/0237402 A1 Oct. 27, 2005

(30) Foreign Application Priority Data

Apr. 23, 2004 (JP) ............................. 2004-129071

(51) Int. Cl.
*H04N 9/64* (2006.01)
*H04N 5/217* (2006.01)
(52) U.S. Cl. ..................... 348/243; 348/241; 348/245
(58) Field of Classification Search .............. 348/222.1, 348/241, 243, 245, 248, 249, 250, 251, 294
See application file for complete search history.

(56) References Cited

U.S. PATENT DOCUMENTS 6,750,910 B1 * 6/2004 Bilhan ....................... 348/243
6,791,607 B1 * 9/2004 Bilhan et al. ................. 348/243
6,806,901 B1 * 10/2004 Mukherjee et al. .......... 348/243
7,081,921 B2 * 7/2006 Nitta et al. ................ 348/229.1
2004/0189839 A1 9/2004 McDermott
2005/0007461 A1 * 1/2005 Chou ...................... 348/222.1

FOREIGN PATENT DOCUMENTS

EP 0 564 305 10/1993
EP 0 710 011 5/1996

OTHER PUBLICATIONS

Patent Abstracts of Japan, vol. 018, No. 088 (E-1507), Feb. 14, 1994 & JP 05 292530 A (Sony Corp), Nov. 5, 1993.

* cited by examiner

*Primary Examiner*—David L Ometz
*Assistant Examiner*—Peter Chon
(74) *Attorney, Agent, or Firm*—Frommer Lawrence & Haug LLP; William S. Frommer (57) ABSTRACT

An optical black level control circuit comprises a digital black level adjusting circuit for generating a black level correction signal by digital processing using a given time constant when an output error between an optical black level and a reference optical black level signal is within a predetermined range so that an error becomes less than a predetermined value and an analog black level adjusting circuit for compensating for said error when said error exceeds the predetermined range.

13 Claims, 5 Drawing Sheets

OPTICAL BLACK LEVEL CONTROL CIRCUIT

CROSS REFERENCES TO RELATED APPLICATIONS

The present invention contains subject matter related to Japanese Patent Application No. 2004-129071 filed in the Japan Patent Office on Apr. 23, 2004, the entire contents of which being incorporated herein by reference.

BACKGROUND OF THE INVENTION

1. Field of the Invention

The present invention relates to a circuit for adjustment of the optical black level of a solid state image-pickup device and an apparatus using the same.

2. Description of the Related Art

Figure 5:
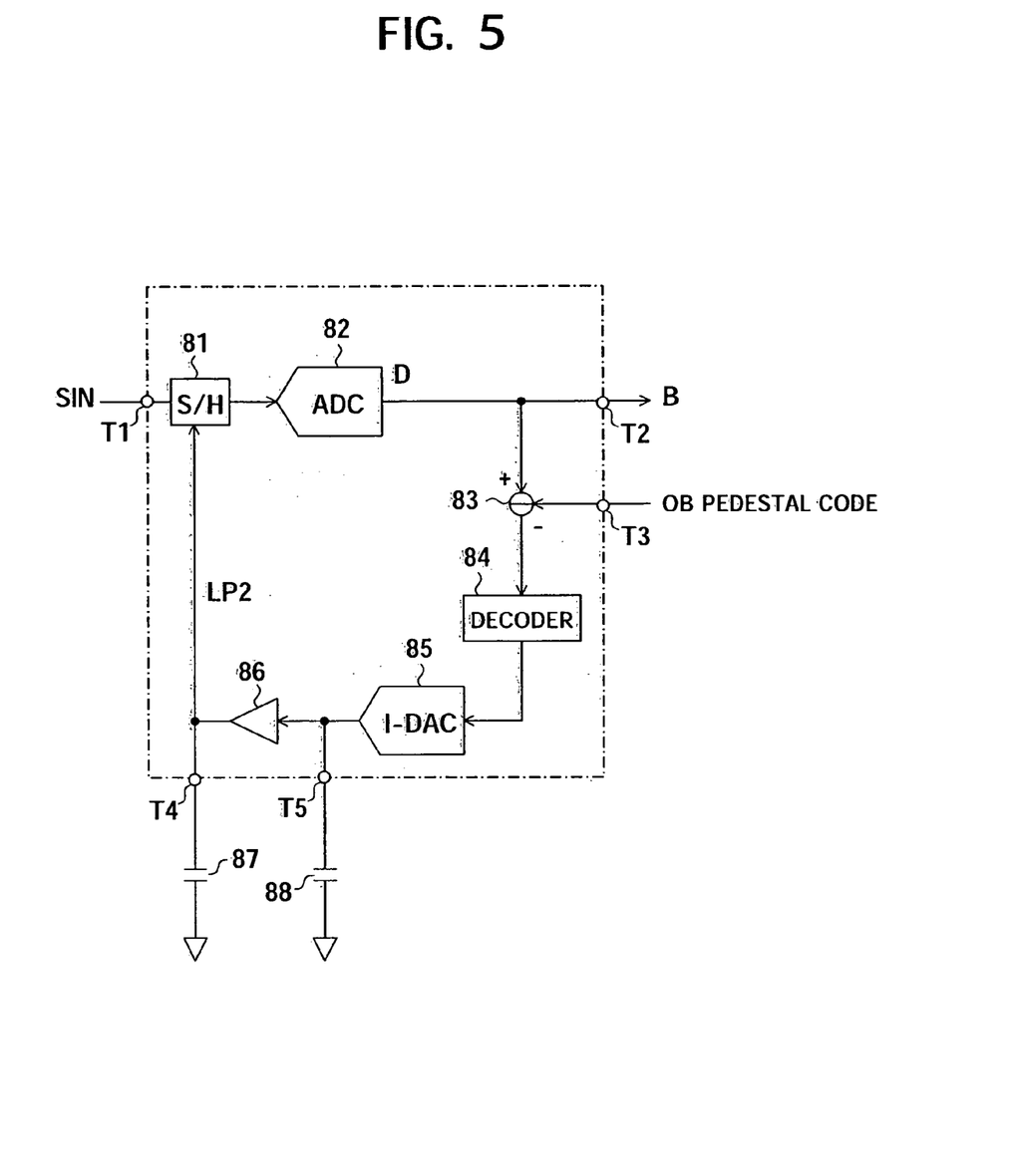
FIG. 5 is a view of the configuration of a related optical black level compensating circuit.

An example of an optical black level compensating circuit (OB compensating circuit or optical black compensating circuit) of a CCD, CMOS sensor, or other image sensor is shown in FIG. 5. An optical black level compensating circuit is a circuit for correcting the black level of a black level signal output region of the image sensor so as to match with the optical black code. The optical black level compensating circuit of FIG. 5 shows part of a signal processing circuit after a signal is output from the image sensor etc. This is provided with a low pass filter (LPF) 2 including a sample/hold circuit (S/H) 81, an analog-digital converter (ADC) 82, a subtractor 83, a decoder 84, a current-output type digital-to-analog converter (I-DAC) 85, external capacitors 87 and 88, and an amplifier 86.

A signal SIN output from an image sensor (not shown) is supplied to the input terminal T1. This input terminal T1 is connected to the input of the sample/hold circuit 81, while the output of the sample/hold circuit 81 is connected to the next analog-to-digital converter 82.

The output of the analog-to-digital converter 82 is connected to an output terminal T2 of the OB compensating circuit and one input terminal of the subtractor 83. The other input terminal of the subtractor 83 is connected to the output of an optical black code circuit and supplied with a digitalized optical black level correction signal. Further, the output of the subtractor 82 is connected to the input of the decoder 84, while the output of the decoder 84 is connected to the input of the current-output type digital-to-analog converter 85. The current-output type digital-to-analog converter 85 converts the input digital signal to an analog signal. The output is connected to the input of the amplifier 86 and the external capacitor 88 forming parts of the low pass filter 2. The output of this amplifier 86 is connected to the external capacitor 87 and the other input of the sample/hold circuit 81.

Here, the capacitors forming part of this low pass filter 2 have to be set to large capacities for correcting the optical black level. Since the capacities are large 0.1 μF or so, formation in an IC is difficult. The capacitors are therefore connected to the outside the IC as the external capacitors 87 and 88.

The analog video signal SIN output from the image sensor etc. is input to sample/hold circuit 81 where it is sampled at a predetermined period. The held signal is supplied to the next analog-to-digital converter 82. The supplied analog video signal is converted by the analog-to-digital converter 82 to a digital signal and, for example, becomes a 12- to 16-bit digital signal which is supplied from the output terminal to the next digital signal processing circuit. This digital signal is supplied to the subtractor 83 where subtraction is performed using this digital signal and the digital optical black code (optical black level correction code) supplied from the input terminal T3. The error signal obtained as a result (digital signal) is output to the decoder 84.

A code for selecting the number of bits is generated based on the data supplied to the decoder (DEC) 84. This generated code is used to control the current-output type digital-to-analog converter 85. As a result, the digitalized error signal from the current-output type digital-to-analog converter 85 is output as an analog current (signal). Next, this analog current (signal) is supplied to the low pass filter 2 and converted to voltage. At this time, the charging/discharging times of the capacitors are determined by the current supply capacity of the constant current circuit of the current-output type digital-to-analog converter 85. The voltage signals appearing at the capacitors are supplied to the other input of the above sample/hold circuit 81. The sample/hold circuit 81 adds or subtracts these with the input signal to correct the output signal of the sample/hold circuit 81. However, when the charging/discharging times of the capacitors are long, the capacitor voltages will not reach the target values in the sampling clock period and an error voltage will be generated. From this, the current supply capability of the current-output type digital-to-analog converter 85 and the capacities of the capacitors must be set so as not to generate error voltage. The input analog video signal is corrected by the OB code of the correction value of the black level.

However, since the above-mentioned optical black level compensating circuit has the low pass filter 2 provided with the external capacitors 87 and 88, there was the problem of the correction value of the black level ending up deviating due to fluctuations in the electrostatic capacity caused by changes in humidity, leakages due to humidity, leakages due to deterioration of properties along with aging, etc.

SUMMARY OF THE INVENTION

It is desirable in the present invention to use two adjustment circuits, that is, a coarse adjustment circuit and fine adjustment circuit, to improve the precision of optical black level adjustment. It is further desirable to digitally process the error signal of the optical black level adjustment (correction) to enable any adjustment time to be set without using capacitors. It is still further desirable to switch a time constant for the state of reception input to the image-sensor etc. so as to enable various forms of fluctuation of conditions of the input video signal to be handled.

To achieve the above desires, according to one aspect of the present invention, there is provided an optical black level control circuit having a digital black level adjusting circuit generating a black level correction signal by digital processing using a given time constant so as to reduce the error to zero when an output error of an optical black level and a reference optical black level signal is within a predetermined range and an analog black level adjusting circuit for compensating for the error when the output error is over the predetermined range.

According to another aspect of the present invention, there is provided an optical black level control circuit provided with a correlated double sampler for clamping at an optical black level and sampling and holding an analog signal, an analog-to-digital converter for converting the analog signal from the correlated double sampler to a digital signal, a first processor for processing the digital signal output from the analog-to-digital converter, a second processor for processing using the data output from the first processor and data storing the results of processing of the second processor and supplying the result to the first processor, and a digital-to-analog converter for converting the output data from the second processor to an analog voltage and supplying this converted output voltage as a clamped signal of the correlated double sampler.

According to another aspect of the present invention, there is provided an optical black level control circuit provided with an analog adjustment circuit for coarse adjustment using an analog signal of an optical black level, a fine digital adjustment circuit for processing this analog signal coarsely adjusted, then converted to a digital signal to adjust the optical black level, and a processor for processing the optical black level while setting the digital adjustment circuits with processing conditions in accordance with a number of horizontal scanning lines.

According to another aspect of the present invention, there is provided an optical black level control circuit provided with a photo detector, an analog adjusting circuit for coarsely adjusting the optical black level generated at this photo detector using an analog signal, and a fine digital adjusting circuit digitally processing this analog signal coarsely adjusted in optical black level, then converted to a digital signal to adjust the optical black level.

As explained above, according to the present invention, by switching the time constant in accordance with the number of lines, convergence of the black level correction operation in several lines, impossible with an analog system, becomes possible. Further, when capturing an image while viewing a monitor, high speed convergence of the operation is achieved even when switching the gain in accordance with the change of brightness, so it is possible to prevent unnatural coloring of frames.

Further, in the case of an analog system, in a high humidity environment, the leakage currents of the capacitors used for the low pass filter etc. cause the correction level of the black level to change, so the problem of a change in the black level between the top and bottom of a frame occurs. In the configuration of the present invention, this problem does not occur. Further, in addition, in the present invention, the error limit function enables fluctuations in the black level due to pixel defects to be prevented. Further, by provision of an error latch function, the black level can be made constant in a frame, so occurrence of line noise can be prevented. In addition, when changing the conditions such as when making the gain variable, it is possible to shift temporarily to the high speed convergence mode to enable convergence in several lines and output a normal image from the start of the frames.

BRIEF DESCRIPTION OF THE DRAWINGS

These and other desires and features of the present invention will become clearer from the following description of the preferred embodiments given with reference to the attached drawings, wherein.

DESCRIPTION OF THE PREFERRED EMBODIMENTS

Preferred embodiments of the present invention will be described in detail below while referring to the attached figures.

Figure 1:
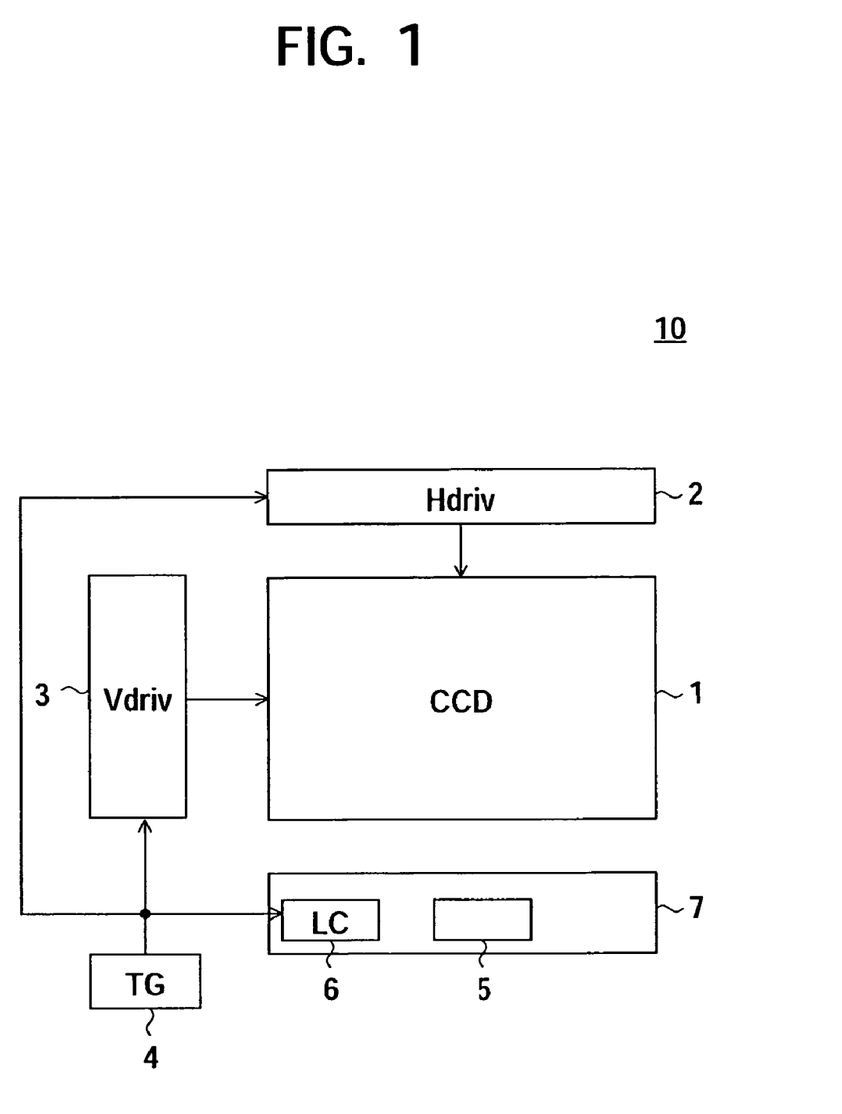
FIG. 1 is a view of the system configuration of a CCD sensor including an optical black level control circuit according to an embodiment of the present invention.

FIG. 1 is a view of the configuration of a CCD system 10 of an optical black level control circuit according to an embodiment of the present invention.

As illustrated, the CCD system 10 of the optical black level control circuit of the present embodiment includes an image sensor 1 formed by a CCD (or CMOS) sensor etc., a horizontal direction driver 2 for driving the image sensor 1 including pixels in a matrix array in the horizontal direction, a vertical direction driver 3 for driving the image sensor 1 in the vertical direction, a timing generator 4 for generating a timing clock, and an analog front end (AFE) 7 including a line counter 6 and optical black level control circuit 5, converting an analog input signal to a digital signal, and correcting its level.

Note that the optical black level control circuit of the present embodiment enables realization of an image signal processing apparatus with a fluctuating black level, for example, an image receiver using an image sensor. Specifically, it enables realization of a CCD (or CMOS) camera, a camera-equipped mobile phone, an 8 mm video camera, a storage-type player, etc.

When the image sensor 1 is for example a CCD type, a plurality of CCD cells are arranged in a matrix of m rows and n columns. n number of CCD cells are arranged in the column direction, that is, the horizontal direction. The sensor is divided into an active region and inactive region. The active region receives light from the outside and generates a signal charge of the optical current. The optical current (electric charge) is determined by the amount of light received and the time. On the other hand, the inactive region shields the CCD cells, for example, using an aluminum thin film layer, to prevent light from entering from the outside. Therefore, in the inactive region, no optical current corresponding to the signal level is generated from the CCD cells. Only a dark current is generated. This dark current is superposed on the output signal current at all times, so it is not required as a current and has to be removed from the signal current.

That is, the CCD sensor 1 is provided with n number of cells arranged in the column direction (X direction) and m number in the row direction (Y direction), that is, is provided with m×n number of elements in total. Further, vertical registers are arranged next to the CCD cells in the column direction. These functions to acquire the signal charges from the CCD cells and transfer them to the vertical direction. Further, it is also possible to provide horizontal registers for taking out signal charges from outputs of the vertical registers and transferring them to the horizontal direction.

These vertical registers and horizontal registers are driven by the horizontal direction driver 2 and vertical direction driver 3. They operate in synchronization with the timing signal supplied from the timing generator 4 and transfer the signal charges.

The timing generator (4) generates a timing signal for supply to the horizontal direction driver 2 and vertical direction driver 3 and generates a plurality of clocks shifted in phase.

Further, the analog front end 7 for processing the signal taken out from the CCD sensor includes a sample/hold circuit for sampling and holding the analog signal output from the CCD sensor, an analog-to-digital converter for converting this sampled and held signal to a digital signal, a subtraction circuit for subtracting an optical black level adjustment (compensation) signal from the digital signal from the analog-to-digital converter, a decoder for controlling a digital-to-analog converter using the result of processing of the processor including this subtraction circuit, a digital-to-analog converter for converting the digital signal to an analog signal by a control signal from the decoder and supplying the analog signal as a correction signal to the sample/hold circuit, a line counter for counting the lines in the horizontal direction of the CCD sensor in synchronization with the timing signal supplied from the timing generator, etc. forming an optical black level control circuit. The detailed configuration of the optical black level control circuit (optical black compensating circuit) 5 and its operation will be explained in detail later.

Figure 2:
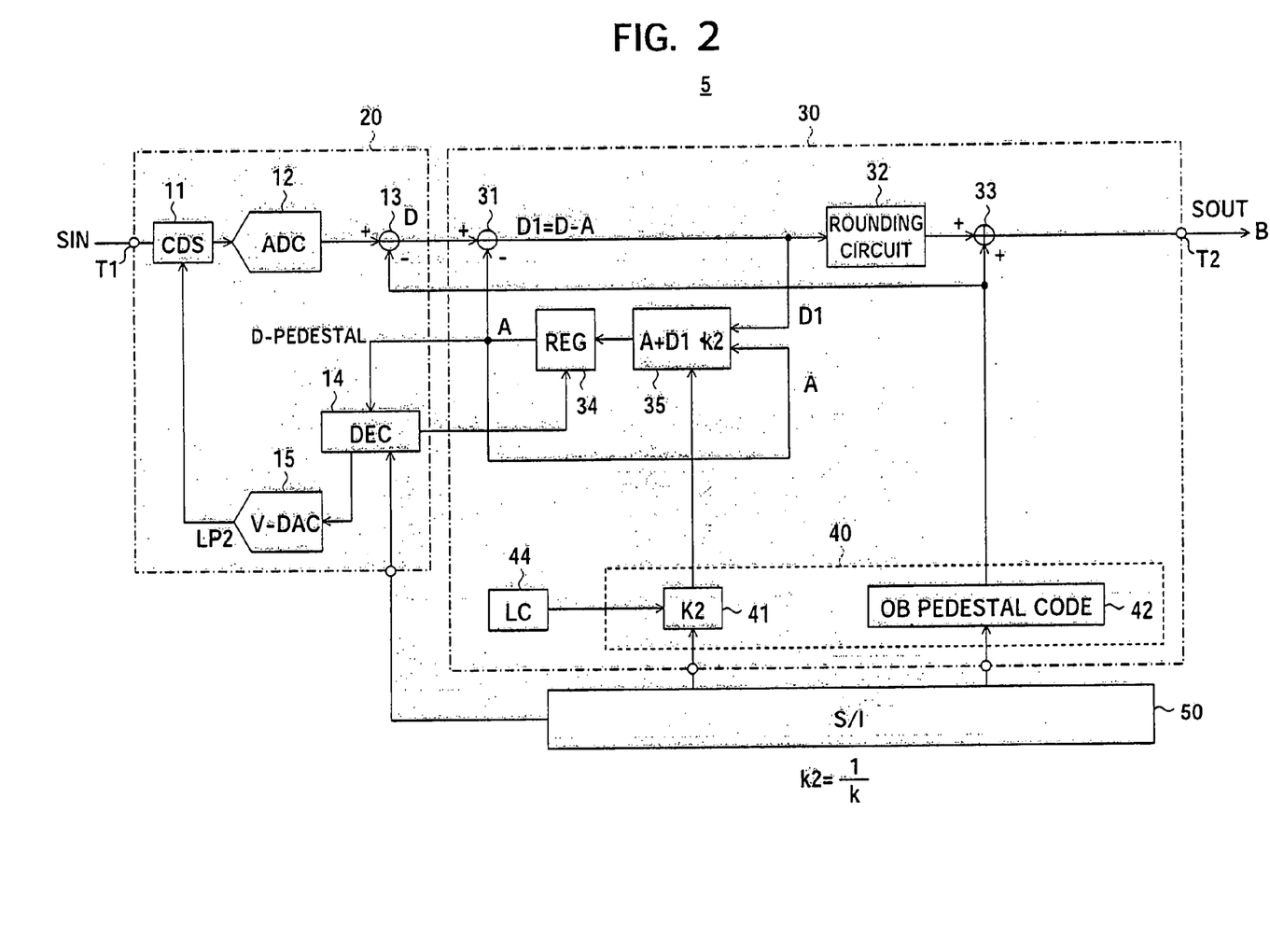
FIG. 2 is a circuit diagram of the configuration of an optical black level control circuit according to an embodiment of the present invention.

FIG. 2 is a view of the state of operation of the OB compensating circuit 5. The optical black compensating circuit 5 is a circuit for correcting the signal of the optically shielded part of the CCD sensor 1 input from the input terminal T1, that is, the black level signal SIN, to a reference black level signal, that is, an optical black level pedestal value OB-PD. A fine digital optical black level adjusting circuit 30 performs correction digitally while the error between the input black level signal SIN and optical black level pedestal value OB-PD is in a predetermined range and outputs a correction black level signal Sout from an output terminal T2. This correction error value is held at a first register 34.

A decoder 14 in a coarse analog optical black level adjuster 20 operates when the error value for correction held in the first register 34 exceeds a threshold, corrects the output of a voltage-type digital-to-analog converter (V-DAC) 15, and sharply changes the value of the reference signal output from the voltage-type digital-to-analog converter 15 to a correlated double sampler (CDS) 11. At this time, the decoder 14 changes the value held in the first register 34 by exactly a value equal to the change of the voltage-type digital-to-analog converter 15.

In this way, the fine optical level adjuster 30 operates in the period when the error is less than a threshold value, while the coarse analog optical black level adjuster 20 operates to sharply change the reference signal input to the correlated double sampler 11 when the error exceeds the threshold.

The coarse analog optical black level adjuster 20 has a correlated double sampler 11, an analog-to-digital converter 12, a first subtractor 13, a decoder 14, and a voltage-type digital-to-analog converter 15. The fine digital optical black level adjuster 30 has a second subtractor 31, a rounding circuit 32, an adder 33, a processor 35, a register 34, and a register 40 for holding a time constant K2 and optical black pedestal code 42. These components will be explained in detail below.

The coarse analog optical black level adjuster 20 will be explained next. The correlated double sampler 11 is provided with a high speed clamp circuit and a sampling circuit. Here, the correction voltage (reference signal) of the black level corresponding to the clamp is supplied from the later-explained voltage-type digital-to-analog converter 15 and input to the correlated double sampler 11. A signal (analog signal) showing the difference between the analog signal showing the black level input to the input terminal T1 and the reference signal is taken out. The analog-to-digital converter 12 is a circuit for converting an analog signal to a digital signal. This is supplied with a hold signal output from the correlated double sampler 11 at its input and converts it to a digital signal in synchronization with the timing signal (CLK) supplied from the timing generator 4. The precision of the output digital signal is preferably at least 12 bits, more preferably 12 to 16 bits. The first subtractor 13 is a digital processing circuit for subtraction of the optical black level pedestal code (value) in the state with the CCD sensor optically shielded (optical black pedestal code) from the data digitalized at the analog-to-digital converter 12. The pedestal value is digitalized.

The decoder 14 receives as input from the first register 34 a correction error signal and performs predetermined processing to control the output analog signal of the voltage-type digital-to-analog converter 15. For example, when the number of bits of the correction error signal is 14 bits, the number of bits of the input signal of the voltage-type digital-to-analog converter 15 is 6 bits, and the correction error signal is outside the range of ±256, it divides the correction error signal by 128, rounds off the result, and changes the input value of the voltage-type digital-to-analog converter 15 by exactly that found value. That is, when the correction error signal is not within a predetermined range, it sharply changes the reference signal output from the voltage-type digital-to-analog converter 15. At this time, the decoder 14 changes the amount of change of the voltage-type digital-to-analog converter 15, that is, the value of the register 34, by the amount of that value multiplied with 128. In this example, the resolutions of the correction error signal and the input signal of the voltage-type digital-to-analog converter 15 were made different, but when the two are made the same resolution, processing by 128 becomes unnecessary. The voltage-type digital-to-analog converter 15 is a voltage-output type high-speed digital-to-analog converter. Since it is a voltage-output type, there is no need to use a conventional current-output type digital-to-analog converter.

Next, the configuration of the fine digital optical black level adjuster 30 will be explained. The operation of the second subtractor 31 is basically the same as the first subtractor 13 provided in the front and explained above. This second subtractor 31 is supplied with digital correction data D output from the prior first subtractor 13 and the data (correction error signal) A from the first register 34, processes them, and outputs the difference D1. The rounding circuit 32 rounds off the data D1 supplied from the subtractor 31. For example, it processes 28-bit binary data to for example 15-bit binary data. This obtains the number of bits substantially required for later data processing by leaving the required bits from the most significant bit (MSB) of the input data and discarding the less significant unnecessary bits to reduce the number of bits.

The processor 35 performs the following filtering using the time constant K2 set from the time constant circuit 41, the current difference D1 output from the subtractor 31, and the previous correction error signal A held in the first register 34.

$$A + D1 \times K2$$

The time constant K2 can be made different for each line of the CCD sensor 1. Therefore, in the present embodiment, the time constant circuit 41 is designed to be able to hold the time constant K2 in accordance with the number of lines of the CCD sensor 1. The time constant K2 is output to the processor 35 where error processing is performed in accordance with the number of lines output from the line counter 44. Note that the time constant K2 is made different for each line to enable the error convergence time to be made different for each line. A specific example will be explained later.

The first register 34 stores past data (correction error signal) A supplied from the processor 35, updates it sequentially in accordance with output data from the processor 35, and temporarily stores the result. The output data from the first register 34 is not only fed back to the processor 35, but also supplied to a second subtraction circuit 31 and a decoder 14 of the coarse optical analog black level adjuster 20. The time constant circuit (K2) 41, as explained above, generates a multiplying factor (digital data) for multiplying any value with the output data D1 from the second subtractor 31 in processing by the processor 35 for optical black level correction. This multiplying factor, that is, the time constant, is formed so as to be able to be variably set with respect to the number of horizontal scanning lines and is set in accordance with a control signal supplied from the line counter (LC) 44. The line counter 44 is a circuit for detecting the lines in the CCD sensor using the frame signal as the starting reference. The control signal is generated based on the frame signal, horizontal synchronization signal, or other result of calculation.

The optical black pedestal code is a signal digitally showing the pedestal value in the optically black state. It is input as serial data from an external or internal system (not shown) to a serial interface circuit (S/I) 50 and transferred from this serial interface circuit 50. This transferred data, that is, the data corresponding to the pedestal at the time of receiving the optically black state, is supplied to the above adder 33.

The serial interface circuit 50 supplies the coefficient value (time constant K2) for correction of the optical black level and the pedestal value for forming the corrected black level digital video signal (luminance signal) to the above time constant circuit 41 and optical black pedestal code register 42.

Next, the operation of the analog front end 50 will be explained.

The signal taken out from the CCD sensor is coarsely adjusted in optical black level by the coarse analog optical black level adjuster 20. The analog signal voltage is input to one input terminal of the correlated double sampler 11, while the optical black level adjustment voltage from the voltage-type digital-to-analog converter 15 is supplied to the other input terminal of the correlated double sampler 11 where a correlated double sampling operation is performed. On the other hand, the optical black level adjustment signal (correction error signal) stored in the first register 34 of the later fine digital optical black level adjuster 30 is input to the decoder 14. There, a control signal for supply to the voltage-type digital-to-analog converter 15 is generated. Next, the analog signal adjusted in optical black level by the correlated double sampler 11 is supplied to the next analog-to-digital converter 12. There, it is converted from an analog signal to a 12- to 16-bit resolution digital signal. The signal converted to a digital format at the analog-to-digital converter 12 is supplied to one input terminal of the next first subtractor 13, an optical black pedestal code (pedestal signal of optical black reception state: digital-signal of for example 10-bit resolution) is supplied from the fine digital black level adjuster 30 to the other input terminal of the subtractor 13, and the difference signal D is derived.

Next, the signal D taken out from the first subtractor 13 is supplied to one input terminal of the second subtractor 31, the data A for optical black level adjustment stored in the first register 34 is supplied to the other input terminal of the subtractor 31, and subtraction is performed to derive the difference signal D1. As a result, a signal adjusted (compensated) in optical black level is obtained from the second subtractor 31.

For example, assume that the output level of the analog-to-digital converter 12 is 520 and the target level of the black level (OB pedestal code) is 512. Assuming here that the value stored in the first register 34 is "0", the output signal D1(=D−A) of the second subtractor 31 becomes 520−512−0=8. This value is supplied to the next processor 35. This processor 35 is supplied with the "0" of the data stored in the first register 34 (in this example, A=0) and the coefficient K2 from the time constant circuit 41. These data are used for processing. Specifically, as explained above, by the processing for addition and multiplication of A+D1×K2, 0+8×K2. Here, K2=1/K. The K value is 2 to the n-th power. When n=1, that is, K=2, K2=1/2, so the result of processing becomes 4. Here, the processing of D1×K2 will be called "filtering". Therefore, the value of the value 4 of the result of filtering at the processor 35 and the value 0 of the first register 34, that is, the value 4, is stored in the first register 34.

Next, in the same way, optical black level correction is performed at second time. When the output value of the analog-to-digital converter 12 is the same as before, that is, 520, the output data D of the subtractor 13 is 8. Since the value A stored in the register 34 is 4, the output data D1 of the subtractor 31 becomes 4. If considering now the case of fixing the K value, since K=2, K2=1/2 and the result of filtering of the processor 35 becomes 4/2=2. The result and the value 4 stored in the first register 34 are added to obtain the value 6. Therefore, the value 6 of the result of processing obtained from the processor 35 is stored in the first register 34.

After this, similar processing is performed. The result of filtering at the processing the third time becomes 1, the result of output of the processor 35, that is, the value stored in the first register 34, becomes 7, and the values in the processing the fourth time become 0.5 and 7.5.

As a result, the filtered value decreases to 4, 2, 1, 0.5, . . . in accordance with the power of 2. Further, the value stored in the first register 34 increases to 0, 4, 6, 7, 7.5, . . . . The results of these processing are shown in Table 1.

Here, the target value was made 512, and the analog-to-digital converter output was made 520.

TABLE 1

| Target value | ADC output | ADC output - OB pedestal code (D) | Register 34 (A) | D-A | Filtering D1 × K2 |
|---|---|---|---|---|---|
| 512 | 520 | 8 | 0 | 8 | 4 |
| 512 | 520 | 8 | 4 | 4 | 2 |
| 512 | 520 | 8 | 6 | 2 | 1 |
| 512 | 520 | 8 | 7 | 1 | 0.5 |
| 512 | 520 | 8 | 7.5 | 0.5 | 0.25 |

The decoder 14 sets the upper limit and the limit value of addition/subtraction by the control signal. When the input signal is within these limits, that is, in the range of the upper limit and lower limit, the data output from the decoder 14 to the voltage-type digital-to-analog converter 15 is not updated. On the other hand, when the value A supplied from the first register 34 to the decoder 14 increases and that value A exceeds the upper limit or lower limit value of the decoder 14, the data supplied to the voltage-type digital-to-analog converter 15 is updated, the updated digital data is converted to an analog voltage, and the analog voltage is supplied as an optical black level adjustment value to the correlated double sampler 11. The correlated double sampler 11 adjusts the optical black level of the input analog signal. In the latter case, further, the decoder 14 updates the value A stored in the register 34 exactly the same as the update data of the voltage-type digital-to-analog converter 15.

From the above operation, when the value A supplied to the decoder 14 is in the range of the upper limit or lower limit set at the decoder 14, the fine digital optical black level adjuster 30 repeats the above operation for fine adjustment of the optical black level. When the value A is outside the range of the set upper limit and lower limit, the coarse analog optical black level adjuster 20 performs coarse adjustment of the optical black level.

Figure 3:
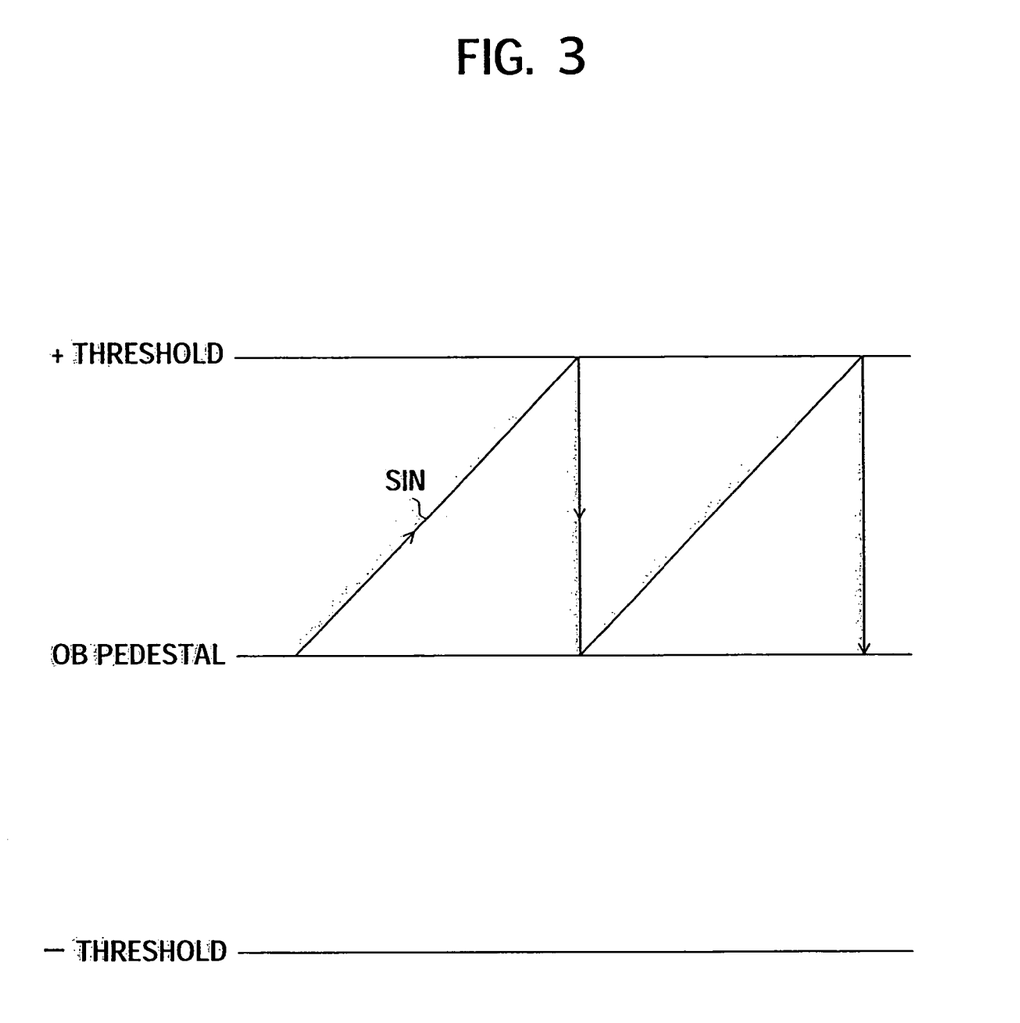
FIG. 3 is a view of the state of operation of an optical black level control circuit according to an embodiment of the present invention.

This series of operations is shown in FIG. 3. When the output of the register 34, that is, the correction error signal A, is in the range of the limit (reference value) of the decoder 14 centered about the OB pedestal, this is corrected at the fine digital optical black level correction circuit 30. When the correction error signal A exceeds the limit, the corrected data is transferred from the decoder 14 to the voltage-type digital-to-analog converter 15.

The output voltage of the voltage-type digital-to-analog converter 15 is supplied to the correlated double sampler 11, where the correction processing is repeated. When the correction error signal A is 14 bits and the input signal of the voltage-type digital-to-analog converter 15 is 6 bits, ±256 may be used as an example of the limit. For example, when the correction error signal A is 300, since this is outside the range of the limits, this 300 is divided by the unit of updating of the voltage-type digital-to-analog converter 15, that is, 128, and the remainder is rounded off, whereupon 2 is obtained. The decoder 14 supplies the value 30 of the current input signal 32 of the voltage-type digital-to-analog converter 15 minus 2 as a new input signal to the voltage-type digital-to-analog converter 15. Further, it sets the 44 obtained by subtracting the 256 of 2×128 from 300 as the new correction error signal of the register 34. In this way, by making the resolution of the input signal of the voltage-type digital-to-analog converter 15 coarser than the correction error signal stored in the register 34, there is no longer a need to use a good precision voltage-type digital-to-analog converter 15 and the cost of the IC chip can be reduced. Of course, it is also possible to make the correction error signal and the voltage-type digital-to-analog converter 15 the same in number of bits and make the resolution of the two the same. The value of the input signal of the voltage-type digital-to-analog converter 15 held in the decoder 14 can be supplied through the serial interface circuit 50.

Next, the second embodiment will be explained with reference to FIG. 2.

First, the mode of switching the time constant according to the number of lines will be explained.

In the explanation of the first embodiment of FIG. 2, the explanation was given under the condition of a constant time constant K2. Further, it is also possible to switch (change) the time constant in accordance with the number of the horizontal scanning lines. The number of horizontal scanning lines is counted by the line counter 44. In accordance with this count, K, that is, K2=1/K, is set to various values. Specifically, the K value changes the time constant data of the time constant circuit 41 through the serial interface circuit 50 using an internal or external system (not shown here).

The frame signal is used to reset the line counter 44. From line 1 to A1, the time constant may be set to K2=1/2, next, from line A1+1 to A2, the time constant may be set to K2=1/2, then from line A2 on, for example, the time constant may be set to K2=1/128. In this case, the operation from line 1 to line A1 is the same as the explanation of the operation explained in the first embodiment.

From line A1+1 to A2, K2=1/4, so if the output value of the analog-to-digital converter 12 is the same as before, that is, 520, when the initial value of the first register 34 is 0, the output data of the second subtractor 31 is 8. This data is supplied to the processor 35. The value 0 which had been stored in the first register 34 is also supplied. Since the K value remains K=4, K2=1/4, and the result of filtering at this processor 35 is 8/4=2. The result and the value 0 stored in the first register 34 are added resulting in 2. The value 2 of the result of processing at the processor 35 is stored in the first register 34.

After this, similar processing is performed. As a result of filtering by the processing the second time, D−A=8−2=6 and the result of filtering becomes 6/4. This filtering result, that is, 6/4, and 2 are added. The value of 6/4+2 is the result of output of the processor 35. This value is stored in the first register 34.

The value of the processing the third time becomes D−A=8−(6/4+2)=4+1/2, and the filtering value becomes 9/8. This value is added with the 6/4+2 of the value stored in the first register 34. 4+5/8 is output and stored in the first register 34. Further, along with the increase of the lines, similar processing is repeated. As a result, the filtering count rapidly decreases compared with K2=1/2 and the black level correction becomes faster, but the susceptibility to noise increases. In general, if making the time constant K2 greater, that is, if making the K value smaller, the result of filtering-rapidly decreases and the black level correction speed increases, but conversely the susceptibility to noise increases and other contradictory results arise.

Conversely, if making the value of K larger (making the time constant K2 smaller), compared with the case of K2=1/2 explained above, the speed of decrease of the filtering value becomes slower and the speed of black level correction becomes slower. That is, the filtering speed becomes slower and the black level correction becomes slower, but there is the merit of greater resistance to noise.

Therefore, if adopting the configuration of the present invention and making the time constant variable in accordance with the number of lines and considering the speed of adjustment of the optical black level and the effect of noise in the operation, while it used to take several frames to form a beautiful image, if using the functions of the current configuration, this can be realized by a smaller number of frames.

Next, a third embodiment of the present invention, that is, the mode of detection of defective pixels by the number of lines, will be explained using FIG. 4.

Figure 4:
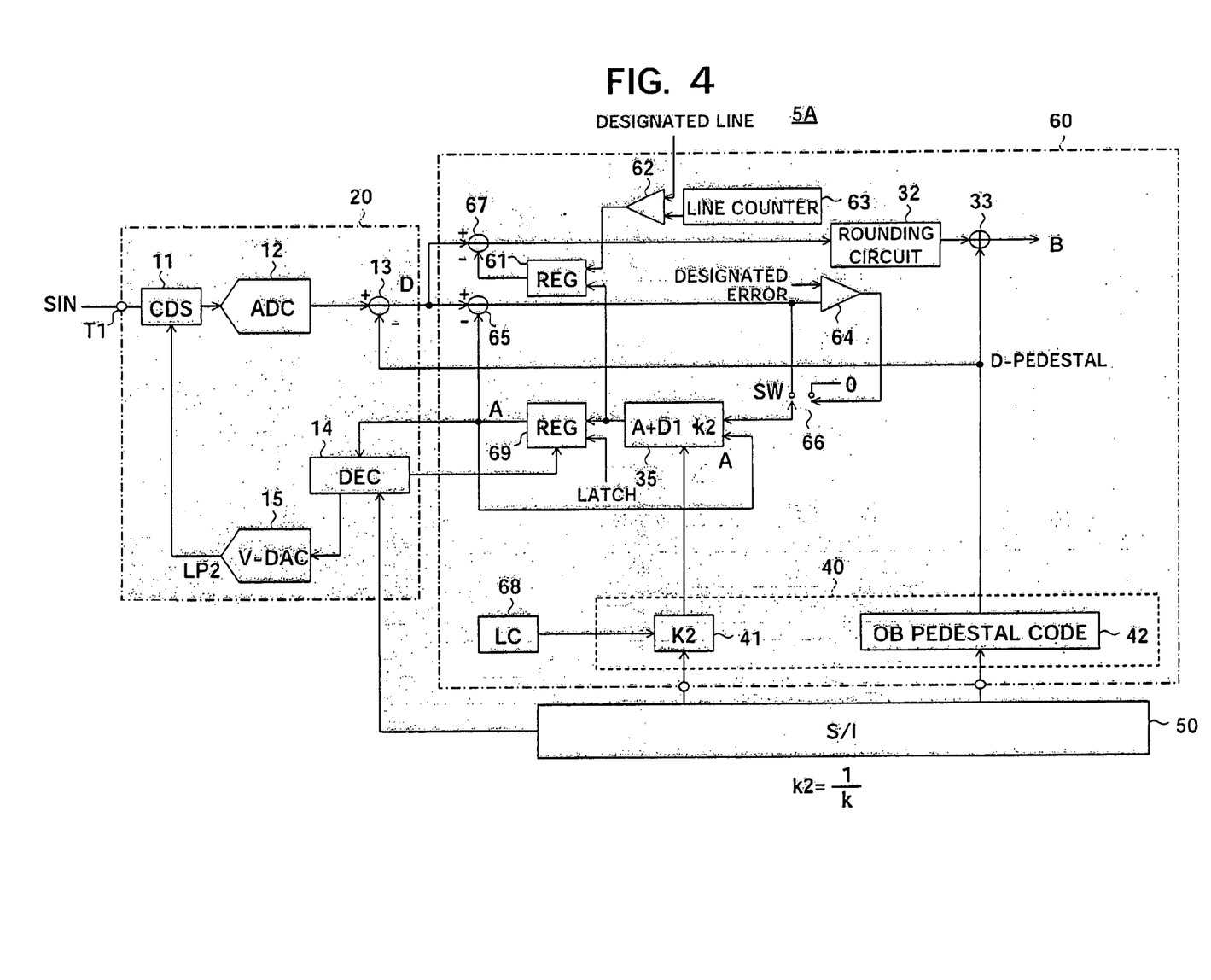
FIG. 4 is a circuit diagram of another configuration of an optical black level control circuit according to an embodiment of the present invention.

The optical black level adjuster 5A shown in FIG. 4 is configured as in FIG. 2 plus a line counter function and an error designation function. The basic operation is the same as the above first and second embodiments. Functional parts the same as in FIG. 2 are assigned the same reference numerals.

FIG. 4 shows, in the same way as the second embodiment of FIG. 2, a configuration provided with a coarse analog optical black level adjuster 20 and a fine digital optical black level adjuster 60. The former coarse analog optical black level adjuster 20 is the same as in FIG. 2. (Here, repeat explanations will be omitted.) The latter fine digital optical black level adjuster 60 is further provided with the functions of switching the time constant in accordance with the number of lines, switching the mode of detection of defective pixels in accordance with the number of lines, and switching the mode of error latching in accordance with the number of lines in order to allow various modes to be handled.

The fine digital optical black level adjuster 60 is provided with, in addition to the configuration of FIG. 2, third and fourth subtractors 65 and 67 connected in parallel to the output of the first subtractor 13, a third register 61, a first comparator 62, a line counter 63, a second comparator 64, a switch 66, and a line counter 68. The line counter 68 is provided to enable switching of the time constant by the number of lines. The fourth subtractor 67, third register 61, and first comparator 62 are provided for switching the error latch modes using this. Further, the third subtractor 65, second register 36, processor 35, second comparator 64, and switch 66 are provided for switching the mode of detection of the defective pixels by the number of lines.

Next, the operation of the mode of detection of defective pixels by the number of lines will be explained.

In FIG. 4, a frame signal (not shown) is used to reset the line counter 68 and then the number of lines starts to be counted. Until the lines reach the designated lines, even if the output data from the third subtractor 65 becomes a designated error or more, that error (output data) is used for correction. Next, when the number of lines reaches a predetermined level, the comparison by the second comparator 64 of the output data of the third subtractor 65 and the designated error is deemed valid. When the output data from the third subtractor 65 becomes less than a designated error, the switch 66 is controlled by a control signal output from the second comparator 64 and supplies the output data of the third subtractor 65 to the processor 35. When the output data of the third subtractor 65 becomes the designated error or more, the switch 66 is controlled by a control signal output from the second comparator 64 and supplies the 0 level signal to the processor 35. As a result, when pixel data of a predetermined level or more is input, it is possible to perform an operation ignoring those pixels.

A fourth embodiment of the present invention, that is, switching the mode of error latching by the number of lines, will be explained using FIG. 4.

First, in FIG. 4, the case where the count of the line counter 63 becomes large and reaches a designated line will be explained. At this time, the third register 61 is supplied with a latch control signal. That is, the first comparator 62 supplies the third register 61 with a control signal (latch signal). Due to this control signal, the error data from the processor 35, that is, the black level correction value (A+D1×K2), is supplied to the third register 61 and latched. As a result, the fourth subtractor 67 performs subtraction between the output data of the first subtractor 13 and the latched data and outputs the result to the rounding circuit 32. The adder 33 adds the OB pedestal value with this and outputs the result.

Next, the operation in the period in the error latch mode from the start of the frames to when the line counter value reaches a set value will be explained. The operation during this period is classified into three modes: the normal mode, high speed convergence mode, and power-on mode. Below, the different modes will be explained.

First, the normal mode will be explained using FIG. 4. At the time of this normal mode, it is judged if the initial error value A for correction of the frames is larger or smaller than an upper limit reference value. In accordance with the result of judgment, the filtering of the processor 35 is executed. The rest is the same as explained above, so further explanation will be omitted. To enable the operation to be understood more easily, consider the time constants K1>K2>K3 (for example, K1=1, K2=1/4, K3=1/210).

When frames are supplied, if the initial error value A exceeds the above-mentioned upper limit reference value, the decoder 14 updates the value of the voltage-type digital-to-analog converter 15. Further, simultaneously, it subtracts from the error value A of the fourth register 69 exactly the amount of updating of the voltage-type digital-to-analog converter 15. From line 0 to A1, it operates setting the time constant to K1 (=1/K, K=1). In this case, while operating at a high speed, the noise has no effect. Next, from line A1+1 to A2, it operates setting the time constant to K2. Here, it is possible to reduce the noise by using K2 (=1/K, K=4).

Further, from the line A2 on, it is possible to completely eliminate noise with the time constant K3 (=1/K ; K=210).

When the error value A when the next frame is supplied is less than the reference value, the values of the voltage-type digital-to-analog converter 15 and the fourth register 69 holding the error value are held as they are. From line 1 to A2, the processing is performing with the time constant set to for example K2. From the line A2 on, the time constant operates as the above-mentioned K3 (here, K1 is not used).

Next, the high speed convergence mode will be explained. At the time of this mode, at the start of the frame signal, a predetermined value is added to the current value of the voltage-type digital-to-analog converter 15. A value corresponding to the value of the predetermined value is subtracted from the error value A held in the fourth register 69 to update this value. At this time, from line 1 to A1, the time constant K1 is used for the operation. From line A1+1 to A2, the time constant K2 is used for the operation. Further, from line A2 on, the time constant K3 is used for the operation.

Specifically, if operating making line 1 K1 and making line 2 K2, a satisfactory result is obtained. In other words, it is possible to achieve normal operation in 2 lines, i.e., high speed operation becomes possible.

If trying to set the time constant in accordance with the lines in this way to enable higher speed operation, it is possible to prevent color deviation due to the change of gain when using a camera etc. to take pictures changing rapidly from a bright location to a dark location.

Next, the power-on mode will be explained. In the transient state when the power is turned on, the operation of the system as a whole is still unstable for a while. At the time of this mode, at the start of the frame signal, the current value of the voltage-type digital-to-analog converter 15 is set to a predetermined value (for example, with 6-bit data, 32 plus 31 or 63), a predetermined value (for example, with 14-bit data, 128×31) is added to the error value A, and the error value held in the fourth register 69 is set to that predetermined value plus a certain value (128×31). From line 1 to A1, the time constant is set to K1 for operation, while from line A1+1 to A2, the time constant K2 is used for operation. Further, from line A2 on, the time constant K3 is used for operation. In this way, by changing the time constant to switch the filtering of the black level correction when turning on the power, it is possible to adjust the optical black level at a high speed even when the power is on.

As explained above, according to the present invention, by switching the time constant in accordance with the number of lines, convergence of the black level correction operation in several lines, impossible in an analog system, becomes possible. Further, even when picking up an image while viewing a monitor, high speed convergence is possible even when switching the gain in accordance with a change in brightness, so it is possible to prevent unnatural coloring of frames.

Further, in the case of an analog system, under a high humidity environment, the leakage current of the capacitors used for the low pass filter etc. causes the correction level of the black level to change, so the problem arises of the black level changing between the top and bottom of a frame etc., but in the configuration of the present invention, this sort of problem does not arise.

In addition, in the present invention, the error limit function enables fluctuation of the black level due to pixel defects to be prevented. Further, provision of the error latch function enables the black level to be made constant in a frame, so can prevent occurrence of line noise. In addition, when changing the conditions such as when making the gain variable, it is possible to temporarily shift to the high speed convergence mode to enable convergence in several lines and output a normal image from the start of the frames.

It should be understood by those skilled in the art that various modifications, combinations, sub-combinations, and alterations may occur depending on design requirements and other factors insofar as they are within the scope of the appended claims or the equivalents thereof.

We claim:
1. An optical black level control circuit, comprising:
a digital black level adjusting circuit for generating a black level correction signal by digital processing using a given time constant when an output error between an optical black level and a reference optical black level signal is within a predetermined range so that an error becomes less than a predetermined value;
an analog black level adjusting circuit for compensating for said error when said error exceeds the predetermined range;
a processing circuit for error processing within the digital black level adjusting circuit, for generating the black level correction; and
a time constant circuit for setting, as the given time constant, a correction coefficient for correction used in the error processing of said processing circuit.

2. An optical black level control circuit, comprising:
a correlated double sampler for clamping at an optical black level and sampling and holding an analog signal to correct a black level in an analog manner,
an analog-to-digital converter for converting an analog signal from said correlated double sampler to a digital signal,
a first processor for processing the digital signal output from said analog-to-digital converter,
a second processor for processing using the data output from said first processor and data storing the results of previous processing of the second processor and supplying the results to said first processor for filtering,
a digital-to-analog converter for using output data from said second processor for conversion to an analog voltage and supplying the converted output voltage as a clamped signal of said correlated double sampler, and
a decoder at the output of said second processor controlling said digital-to-analog converter by an output signal of said decoder.

3. An optical black level control circuit as set forth in claim 2, wherein said decoder is provided with a limit function and said digital-to-analog converter and said second processor are controlled in accordance with results of judgment of said limit function.

4. An optical black level control circuit, comprising:
a digital black level adjusting circuit for generating a black level correction signal by digital processing using an optical black level and a reference optical black level signal is within a predetermined range so that the error becomes less than a predetermined value,
an analog black level adjusting circuit for compensating for said error when said error exceeds the predetermined range, and
a processor for processing said optical black level signal while setting processing conditions in accordance with a number of horizontal scanning lines in said digital black level adjusting circuit.

5. An optical black level control circuit as set forth in claim 4, further comprising:
a processing circuit for error processing and
a time constant circuit for setting a correction coefficient of correction data of said processing circuit.

6. An optical black level control circuit, comprising:
a digital black level adjusting circuit for generating a black level correction signal by digital processing using a given time constant when an output error between an optical black level and a reference optical black level signal is within a predetermined range so that the error becomes less than a predetermined value,
an analog black level adjusting circuit for compensating for said error when said error exceeds the predetermined range,
a counter for counting the horizontal scanning lines,
a processor for processing a correction value of the optical black level,
a memory circuit for latching the output data of said processor in accordance with said counter value, and
a control circuit for deriving data of said memory circuit in accordance with the count of said counter.

7. An optical black level control circuit as set forth in claim 6, further comprising a control signal generation circuit for generating a control signal for outputting data of said memory circuit when the count of said counter is a predetermined value or more.

8. An optical black level control circuit comprising:
a digital black level adjusting circuit for generating a black level correction signal by digital processing using a given time constant when an output error between an optical black level and a reference optical black level signal is within a predetermined range so that the error becomes less than a predetermined value,
an analog black level adjusting circuit for compensating for said error when said error exceeds the predetermined range,
a counter for counting horizontal scanning lines,
a processor for finding an adjustment value of the optical black level,
a coefficient setting circuit for setting a processing adjustment coefficient of said processor, and
a mode generator for switching the black level control circuit in accordance with the system operation when the count of said counter is a predetermined value or less.

9. An optical black level control circuit as set forth in claim 8, wherein said mode generator is provided with a judging means for judging the magnitude of the optical black level error value at the start of a frame signal.

10. An optical black level adjustment method comprising the steps of:
generating a black level correction signal by digital processing using a given time constant when an output error between an optical black level and a reference optical black level signal is within a predetermined range so that an error becomes less than a predetermined value,
compensating for said error in an analog manner when said error exceeds the predetermined range, and
setting as the given time constant a correction coefficient for correcting the digital processing.

11. An optical black level adjustment method, comprising the steps of:
clamping at an optical black level and sampling and holding an analog signal to correct a black level in an analog manner,
converting an analog signal from a correlated double sampling step to a digital signal,
processing at a first time the digital signal output from said AD conversion step,
processing at a second time using the data obtained by said first processing step and data storing the results of previous processing of the second processing step and supplying the results to said first processing step for filtering,
using output data from said second processing step for conversion to an analog voltage and supplying the converted output voltage as a clamped signal of said correlated double sampling step,
decoding the results of said second processing step, and controlling the conversion of said analog signal by said decoding.

12. An image signal processing apparatus comprising an optical black level control circuit for adjusting the optical black level of a picked up image signal, where
said optical black level control circuit is provided with:
a digital black level adjusting circuit for generating a black level correction signal by digital processing using a given time constant when an output error between an optical black level and a reference optical black level signal is within a predetermined range so that the error becomes less than a predetermined value;
an analog black level adjusting circuit for compensating for said error when said error exceeds the predetermined range;
a processing circuit for error processing within the digital black level adjusting circuit for generating the black level correction; and
a time constant circuit for setting, as the given time constant, a correction coefficient for correction used in the error processing of said processing circuit.

13. An image signal processing apparatus comprising an optical black level control circuit for adjusting the optical black level of a picked up image-signal, wherein
said optical black level control circuit is provided with:
a correlated double sampler for clamping at an optical black level and sampling and holding an analog signal to correct a black level in an analog manner,
an analog-to-digital converter for converting an analog signal from said correlated double sampler to a digital signal,
a first processor for processing the digital signal output from said analog-to-digital converter,
a second processor for processing using the data output from said first processor and data storing the results of previous processing of the second processor and supplying the results to said first processor for filtering,
a digital-to-analog converter for using output data from said second processor for conversion to an analog voltage and supplying the converted output voltage as a clamped signal of said correlated double sampler, and
a decoder at the output of said second processor controlling said digital-to-analog converter by an output signal of said decoder.

* * * * *